Figure 16:
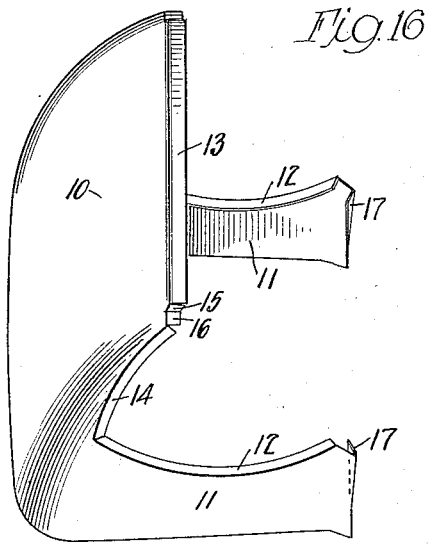

N. M. WILLET.
CLAMP FOR FORMING SHEET METAL SHAPES.
APPLICATION FILED FEB. 11, 1915.
1,154,224.
Patented Sept. 21, 1915.
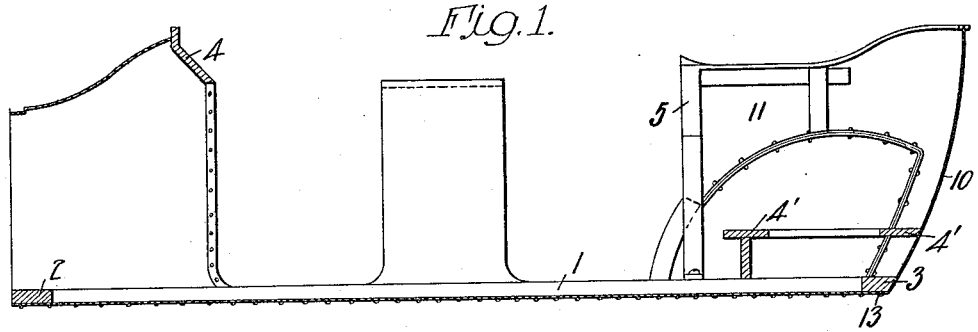
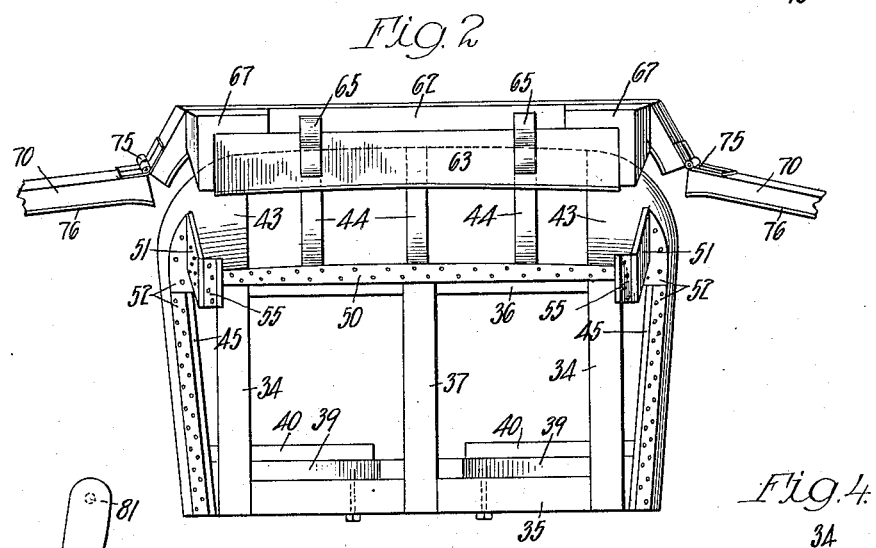
WITNESSES:
EPBarrett
H.W.Kreinbring
INVENTOR
Nicholas M. Willet
BY
Pagelsen & Spencer
ATTORNEYS N. M. WILLET.
CLAMP FOR FORMING SHEET METAL SHAPES.
APPLICATION FILED FEB. 11, 1915.
1,154,224.
Patented Sept. 21, 1915.
6 SHEETS—SHEET 2.
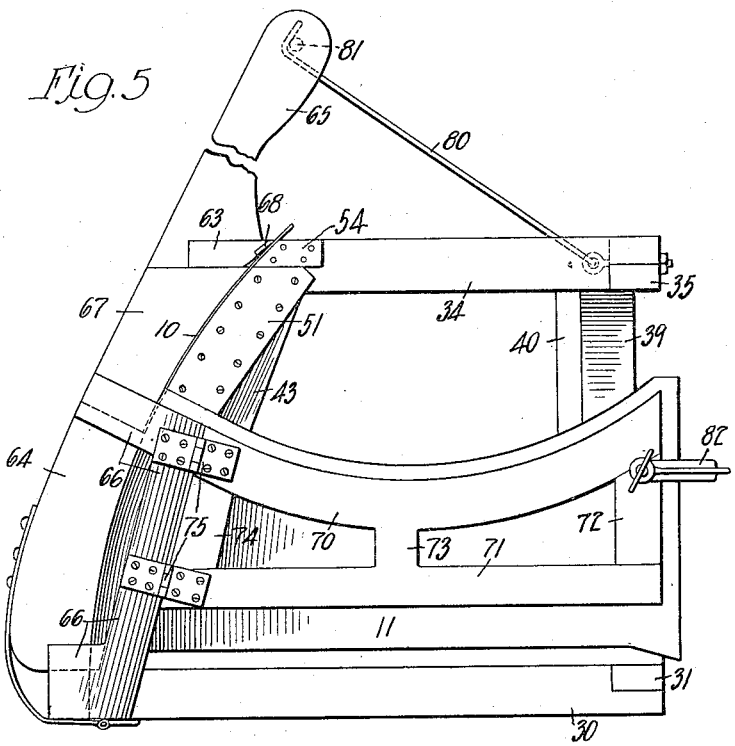
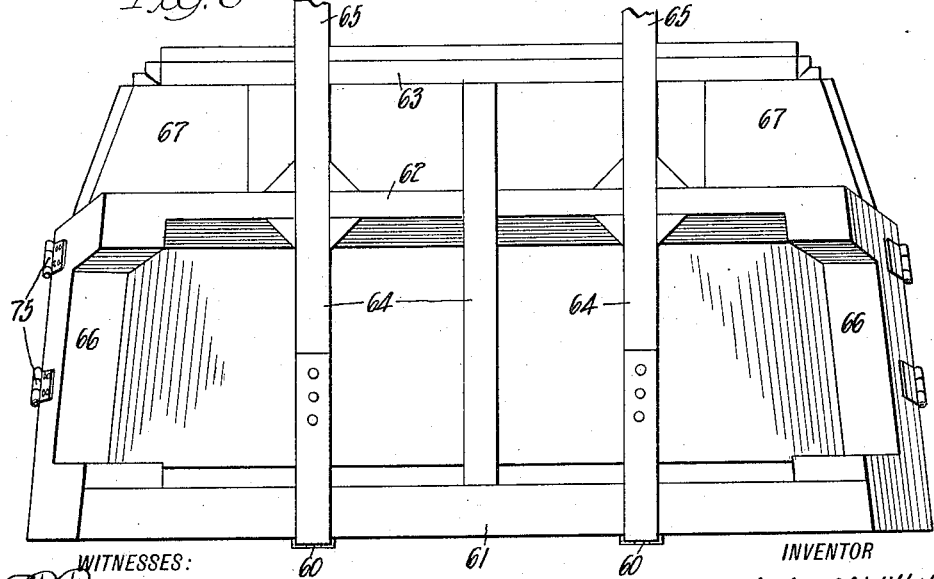
INVENTOR
Nicholas M. Willet
BY
Pagelsen & Spencer
ATTORNEYS

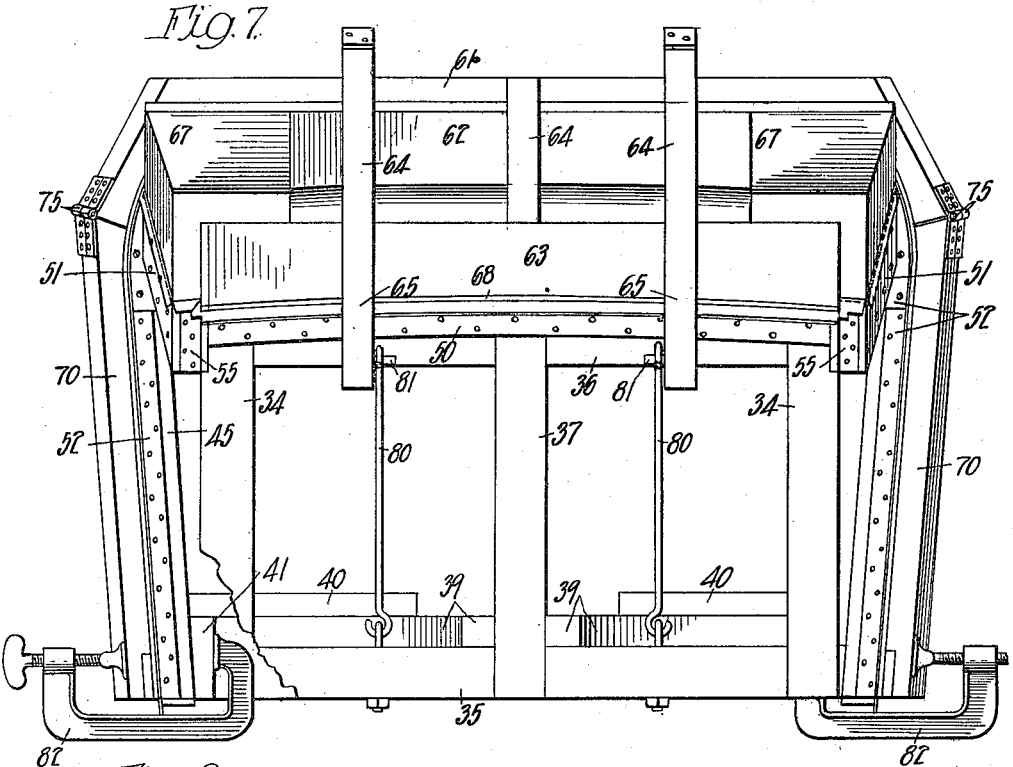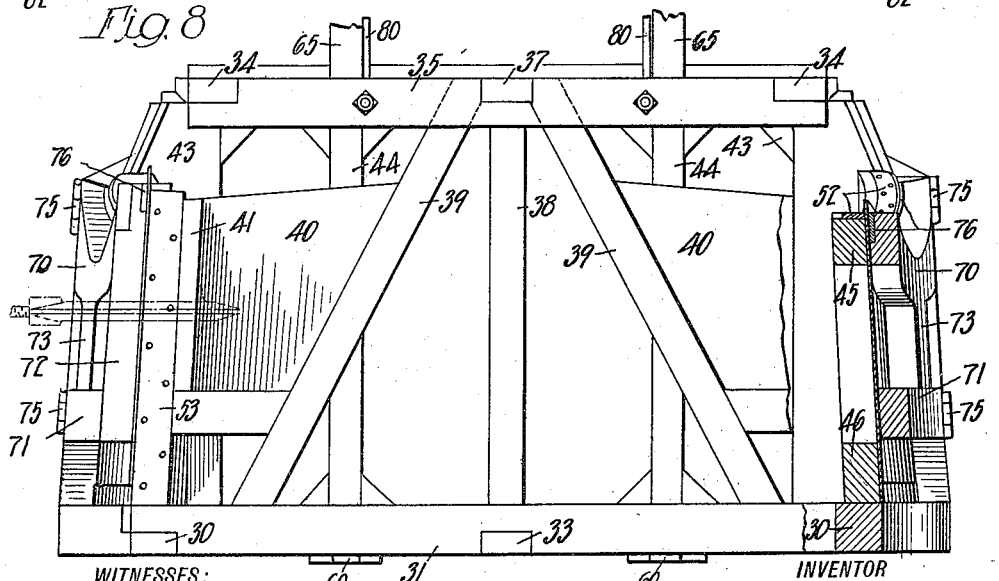

N. M. WILLET.
CLAMP FOR FORMING SHEET METAL SHAPES.
APPLICATION FILED FEB. 11, 1915.
1,154,224.  Patented Sept. 21, 1915.
6 SHEETS—SHEET 4.
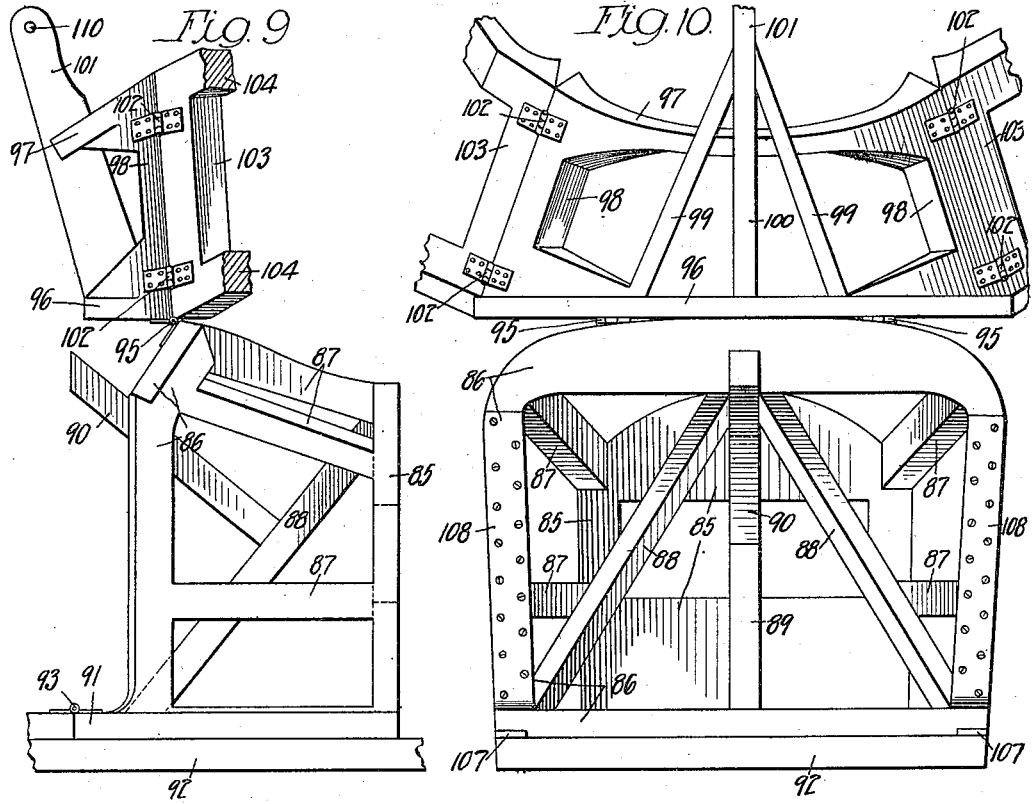
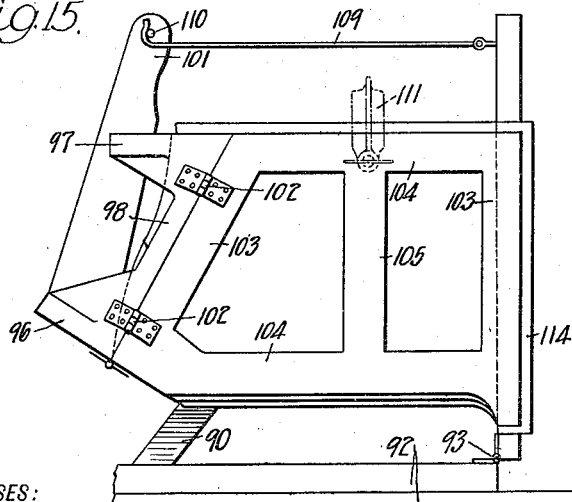
WITNESSES:
INVENTOR
Nicholas M. Willet
BY
Pagelsen & Spencer
ATTORNEYS

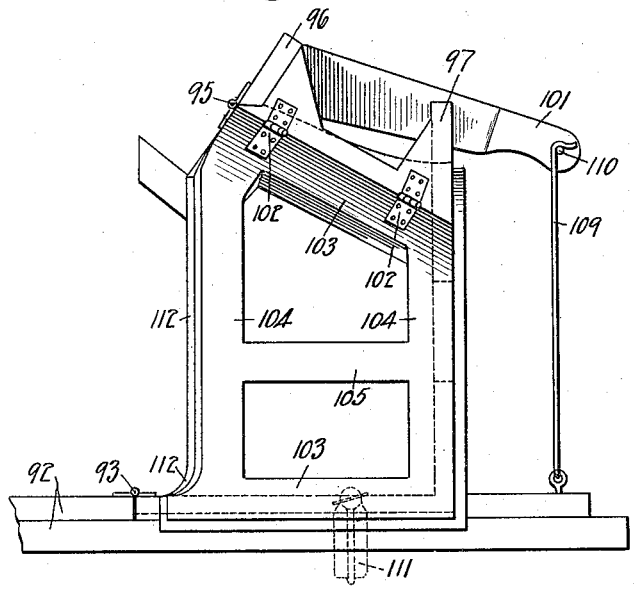
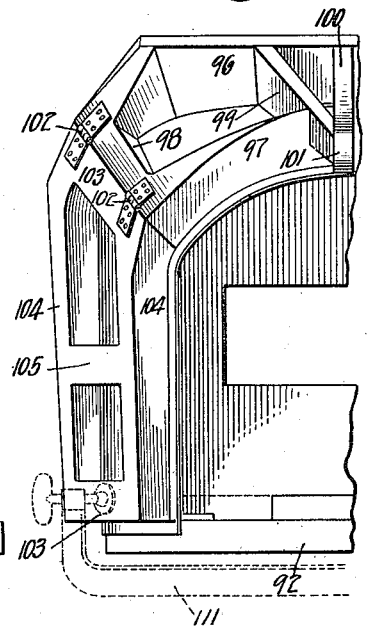
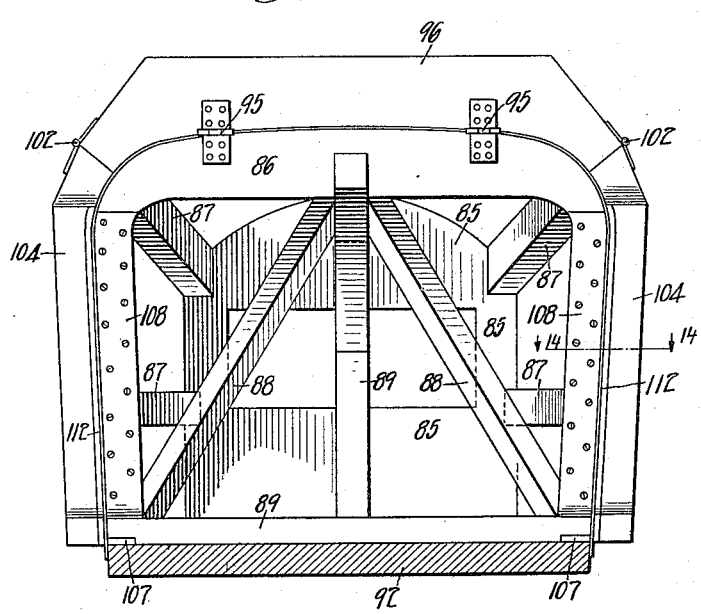
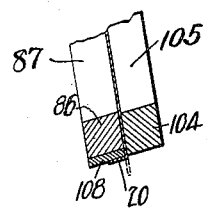

N. M. WILLET.
CLAMP FOR FORMING SHEET METAL SHAPES.
APPLICATION FILED FEB. 11, 1915.

1,154,224.

Patented Sept. 21, 1915.
6 SHEETS—SHEET 6.

WITNESSES:
E. R. Barrett
H. W. Kreinbring

INVENTOR
Nicholas M. Willet
BY
Pagelsen & Spencer
ATTORNEYS

UNITED STATES PATENT OFFICE.

NICHOLAS M. WILLET, OF DETROIT, MICHIGAN.

CLAMP FOR FORMING SHEET-METAL SHAPES.

1,154,224.  Specification of Letters Patent.  Patented Sept. 21, 1915.

Application filed February 11, 1915. Serial No. 7,612.

*To all whom it may concern:*

Be it known that I, NICHOLAS M. WILLET, a citizen of the United States, residing at Detroit, in the county of Wayne and State of Michigan, have invented a new and useful Clamp for Forming Sheet-Metal Shapes, of which the following is a specification.

Automobile bodies are, as is common knowledge, made largely of pressed sheet metal; it is very desirable to form them of as few members as possible, because seams are thereby avoided and a cheaper construction produced. The members are, for the most part, joined to one another and to the frame of the body through in-turned edge-flanges that may be welded to an adjacent flange or nailed to the adjoining member of the frame, thus allowing the body to present a smooth and unbroken appearance. However, on account of the peculiar shape of the parts (particularly those of double curvature) and the position of the seams and frame pieces, it is impossible in many cases to form the in-turned flanges or nailing strips in the press; it is customary, therefore, to provide sufficient excess material to form the necessary margin, and to afterward bend it to the proper angle to the contour of the body. The bending operation has heretofore been performed by striking the marginal edge with a mallet or hammer, twisting and turning the substantially unsupported blank variously to allow access by the workman—a practice that was at once slow and laborious, and that often resulted, owing to the size and weight of the parts, in bending the shape away from the contour given it by the press.

These disadvantages are entirely overcome by the present invention which consists in a clamp, one element of which is shaped to conform to the contour of the finished metal shape and another element of which is sectional and arranged to coöperate with the first mentioned element in rigidly holding the metal shape in position, one of the elements being provided with surfaces over which the margins of the metal may be bent to form the flanges or nailing strips.

The present invention further consists in the details of construction shown, described and particularly pointed out in the subjoined claims.

Figure 17:
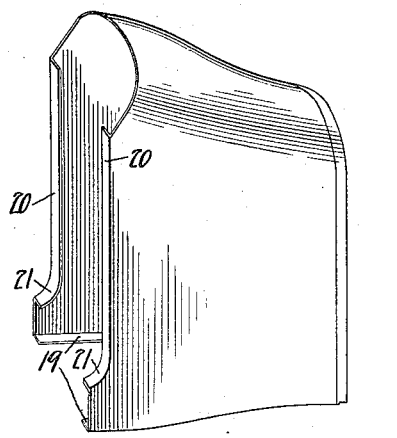
Figure 18:
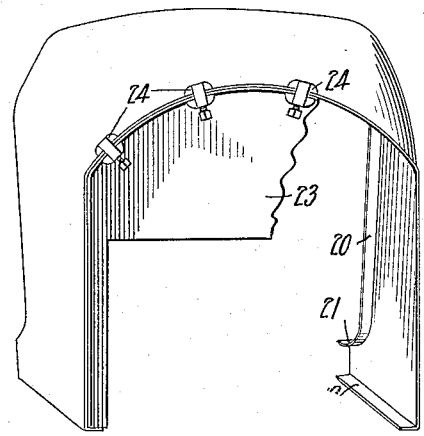
Figure 19:
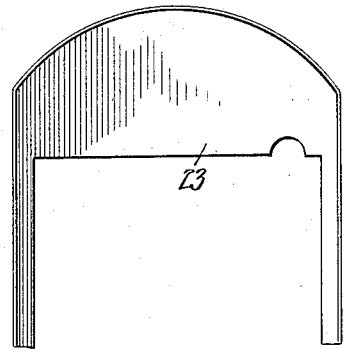

In the drawings, Figure 1 is a longitudinal section through the body of a motor vehicle showing two sheet metal shapes, one of which will be termed a cowl and the other a seat-back, to which the present invention is applicable. Fig. 2 is a plan view of a clamp for the seat-back, the clamp being open. Fig. 3 is a side view corresponding to Fig. 2 the wing sections of the clamp being broken away. Fig. 4 is a perspective view of one corner of the clamp, the latter being closed and the metal being in position ready to be bent. Fig. 5 is a side view of the clamp in closed position. Fig. 6 is a fragmentary rear view corresponding to Fig. 5. Fig. 7 is a plan view of the clamp in closed position, parts being broken away, showing hand clamps for holding the main clamp closed. Fig. 8 is a rear view of the clamp in closed position, parts being broken away. Fig. 9 is a side view of a clamp for use in forming the cowl-portion, the clamp being open. Fig. 10 is an elevation taken from the left side of Fig. 9, parts being broken away. Fig. 11 is a side view, the clamp being closed upon the sheet metal. Fig. 12 is a half-front view of the parts shown in Fig. 11. Fig. 13 is a rear elevation corresponding to Fig. 11. Fig. 14 is a section on the line 14—14 of Fig. 13. Fig. 15 is a side view corresponding to Fig. 11, the parts being turned back over the heel pivot to allow access to the bottom flanges of the metal the location of the hand clamp being different from that shown in Fig. 11. Fig. 16 is an inverted perspective view of the seat-back shown in Fig. 1. Fig. 17 is a perspective view of the cowl shown in Fig. 1, looking from the rear. Fig. 18 is a similar view from the front, also showing the manner in which the cowl front and cowl may be assembled while in the clamp. Fig. 19 is a front view of the cowl front.

Similar reference characters refer to like parts throughout the several views.

As shown in Figs. 1, 16, 17, 18 and 19, the body of a certain type of automobile consists, at one stage of construction, in a frame that includes the longitudinal bars 1, the lower transverse bars 2 and 3, the upper forward cross-bar 4, the lower rear seat bars 4' and the edge piece 5 for the rear door frame. The rear end of this frame constitutes the support for the seat-back (Fig. 16); and the front end has secured thereto the cowl (Figs. 17, 18 and 19).

The seat-back may include the curved rear 10 and the forwardly projecting sides 11, the former constituting the back of the vehicle and the latter extending forward to form side pieces above the mud-guards, and having their lower edges shaped to conform to the curvature of the upper edge of the guard. In order to allow the seat-back to be secured to the frame, the lower edges of the side pieces may be turned over at 12, the lower edge of the portion 10 may be turned over at 13, the side edges of the portion 10 below the sides 11 may be turned over at 14, and the corner between the portions 13 and 14 may be bent as indicated at 15 and 16. The ends of the side portions may also be bent at 17.

The cowl may be of the usual "streamline" type and may have its lower edges turned under at 19, and its rear edges bent in at 20 and curved near the bottom as indicated at 21.

It will be understood that the various bent edges enumerated are, when the sheet comes from the press, merely excess marginal material, and that the bending operation takes place while in the clamps. The front 23 of the cowl may also be applied thereto in the clamp, and secured ready for the welding operation by small hand clamps 24.

Figs. 2 to 8, inclusive, relate to the clamp for the seat-back; Figs. 9 to 14, inclusive, to that for the cowl.

The lower base of the inner element of the seat-back clamp (Figs. 2, 3 and 8) may be formed of the longitudinal side bars 30, the front cross-bar 31, the rear cross-bar 32 and the intermediate longitudinal bar 33, mortised or otherwise secured together. Similarly, the upper base may include the longitudinal side bars 34, the front cross-bar 35, the rear cross-bar 36 and the intermediate longitudinal bar 37. The cross-bars 31 and 35 may be joined by the intermediate upright 38 and the inclined braces 39; and the braces may have secured thereto laterally extending boards 40 having edge cleats 41 that constitute anchoring surfaces for hand clamps, as will be explained later. The upper and lower bases are preferably joined at the rear by the curved corner pieces 43 and the intermediate bars 44. Projecting forwardly from each of the corner pieces 43 is a side frame, the upper surface of the upper member 45 of which is curved to correspond to the curvature of the lower edge of the side 11; the remainder of the frame may be formed of the lower bar 46, the upright 47 and the front corner piece 48. These corner pieces are connected to and braced by the boards 40.

It will be understood that the fixed frame forms a surface the counterpart of the interior of the seat-back, and that, when the latter is held in place thereon, the edges may be bent around the edges of the various frame pieces to form the flanges 12 to 17, inclusive. In order to insure sharp bends, the frame elements 36, 43, 45 and 48 may have their edges protected, respectively, by the metal plates 50, 51, 52 and 53. The upper end of the corner pieces 43 may also be notched and faced by the metal plates 54 and 55 (Fig. 4) to allow the formation of the flanges 15 and 16, respectively.

Hinged to the lower rear edge of the fixed frame at 60 to swing vertically is an outer clamp-element, comprising a main section and two wing sections capable of swinging laterally about the edges of the main section. The main section may include the lower cross-bar 61, the intermediate cross-bar 62, and the upper cross-bar 63 that may be joined by the intermediate uprights 64, one or more of which may be extended above the upper cross-bar to form handles 65, whereby the frame may be swung vertically. The outer ends of the cross-bars 61 and 62 may be joined by the corner pieces 66, and those of the bar 63 may be connected to the intermediate bar by the corner pieces 67; and, if desired, the edge of the bar 63 may be provided with a metal facing 68. Each of the wing sections may include a curved upper bar 70 and a lower bar 71 joined by the front end piece 72, the intermediate upright 73 and the rear end piece 74; and the rear end of the wing section may be connected to the adjacent corner piece 66 by the hinges 75. If desired, the bar 70 may be faced at 76 (Fig. 8) with a metal strip. The inner faces of the main and wing sections are, of course, curved to conform to the curvature of the inner clamp section.

When the wings are swung back on the hinges 75, and the main section is swung back on the hinges 60, one of the seat-backs is placed upon the fixed frame. The movable sections are then swung forward, hooks 80 (that may be anchored to the cross-bar 35) are engaged over pins 81 with which the handles 65 may be equipped, and the wing sections are secured to the cleats 41 by the hand clamps 82. Upon the margins of the seat-back now being struck with a hammer, they are bent over rapidly to form the flanges or nailing strips. The hooks and hand clamps are then released, after which the main section and wings are again swung back to allow the seat-back to be lifted from the frame.

The clamp for the cowl is quite similar to that just described. The inner member, in this case, may be formed of a front cross-frame 85, and a rear cross-frame 86 joined by longitudinal bars 87 and braced by the diagonals 88 and central forwardly inclined member 89 that extend from the lower edge of the rear cross-frame to the upper edge of the forward cross-frame; and the member 89 may be braced, as indicated at 90, for a purpose hereinafter pointed out. In this instance, the inner member of the clamp, instead of being fixed as previously, is extended rearwardly at 91 and is connected to a fixed base 92 by the hinges 93.

The inner clamp member is embraced by a three-part outer member that is hinged to the upper rear edge thereof at 95, the latter of which preferably includes a main member formed of the rear cross-bar 96, the front cross-bar 97, the corner pieces 98, the diagonal braces 99 and the intermediate cross-piece 100 that may be extended to form a handle, as shown at 101. Hinged to each of the corner pieces at 102 is a wing member that preferably includes the corner pieces 103, the longitudinal bars 104 and the cross-bar 105. The surfaces of the inner and outer clamp members are curved to conform to the curvature of the cowl, and the frame pieces may be faced where the flanges 19, 20—21 are to be bent, with the metal strips 107 and 108. A hook 109 and pin 110 may be provided to secure the main member of the clamp in closed position as before, and the wing members may be similarly secured by the hand clamp 111.

After the cowl is placed in the clamp, as shown in Figs. 11, 12 and 13, the rear edges (marked 112, Fig. 11) are hammered over against the facings to form the flange 20—21, and the cowl-front is assembled and secured by the hand clamps 24. The entire clamp is then swung 90 degrees about the hinges 93 into the position indicated in Fig. 15, in which it is supported by the bar 90. The margin marked 114 is then hammered over against the facing to form the flange 19.

Many changes may be made in the details of construction without departing from the spirit of my invention; and the device is obviously applicable to a variety of metal shapes other than those shown. I do not, therefore, wish to be limited otherwise than as indicated by the subjoined claims.

I claim:—

1. A clamp for one piece pressed sheet metal shapes comprising one element, the outer surface of which conforms to the inner surface of the desired metal sheet, and another element the inner surface of which conforms to the outer surface of the desired metal sheet, one of the elements comprising a plurality of members, means for connecting one of the members to the first mentioned element to swing vertically thereon, and means for pivotally connecting another of the members to the first mentioned member so as to allow the second member to swing in respect to the first member at an angle to the plane in which the first mentioned member swings on the first mentioned clamp element.

2. A clamp for pressed sheet metal shapes comprising a base, and two clamping elements the outer surface of one of which conforms to the inner surface of the desired metal sheet and the inner surface of the other of which conforms to the outer surface of the sheet, means for pivotally connecting the first mentioned element to the base to allow the former to swing on the latter in a vertical plane, the second mentioned element comprising a plurality of members, means for pivotally connecting one of the members to the first mentioned element to allow the former to swing on the latter in a vertical plane, means for pivotally connecting another of the members to the pivoted member to allow the former to swing on the latter at an angle to the plane in which the said pivoted member swings on the first mentioned clamp element.

3. A clamp for pressed sheet metal shapes comprising a base, and two clamping elements the outer surface of one of which conforms to the inner surface of the desired metal sheet and the inner surface of the other of which conforms to the outer surface of the sheet, means for pivotally connecting the first mentioned element to the base to allow the former to swing on the latter in a vertical plane, the second mentioned element comprising a main member and two wing members, means for pivotally connecting the main member to the first mentioned element to allow the former to swing on the latter in a vertical plane, means for pivotally connecting the wing members to the main member to allow the former to swing on the latter in planes inclined to the plane in which the main member swings on the first mentioned element.

4. A clamp for pressed sheet metal shapes comprising a base, and two clamping elements the outer surface of one of which conforms to the inner surface of the desired metal sheet and the inner surface of the other of which conforms to the outer surface of the sheet, means for pivotally connecting the first mentioned element to the base to allow the former to swing on the latter in a vertical plane, the second mentioned element comprising three members, means for pivotally connecting the several members whereby two of the members may swing in respect to the third, means for pivotally connecting the third member to the first mentioned element whereby the said third member, and the other two members, may swing in respect to the first mentioned element at an angle to the plane in which one of the other two members swings in respect to the third member.

5. A clamp for pressed sheet metal shapes comprising a base, and two clamping elements the outer surface of one of which conforms to the inner surface of the desired metal sheet and the inner surface of the other of which conforms to the outer surface of the sheet, means for pivotally connecting the first mentioned element to the base to allow the former to swing on the latter in a vertical plane, the second mentioned element comprising a main member and two wing members, means for pivotally connecting the main member to the first mentioned element to allow the former to swing on the latter in a vertical plane, means for pivotally connecting the wing members to the main member to allow the former to swing on the latter in planes inclined to the plane in which the main member swings on the first mentioned element, and means for securing the wing members to the first mentioned clamp element to hold the clamp closed upon the sheet of metal.

6. A clamp for pressed sheet metal shapes comprising a base, and two clamping elements the outer surface of one of which conforms to the inner surface of the desired metal sheet and the inner surface of the other of which conforms to the outer surface of the sheet, means for pivotally connecting the first mentioned element to the base to allow the former to swing on the latter in a vertical plane, the second mentioned element comprising three members, means for pivotally connecting the several members whereby two of the members may swing in respect to the third, means for pivotally connecting the third member to the first mentioned element whereby the said third member, and the other two members may swing in respect to the first mentioned element at an angle to the plane in which one of the other two members swings in respect to the third member, and means for securing the two first mentioned members to the first mentioned clamp element to hold the clamp closed upon the sheet of metal.

7. A clamp for pressed sheet metal shapes comprising a base, and two clamping elements the outer surface of one of which conforms to the inner surface of the desired metal sheet and the inner surface of the other of which conforms to the outer surface of the sheet, means for pivotally connecting the first mentioned element to the base to allow the former to swing on the latter in a vertical plane, the second mentioned element comprising a main member and two wing members, means for pivotally connecting the main member to the first mentioned element to allow the former to swing on the latter in a vertical plane, means for pivotally connecting the wing members to the main member to allow the former to swing on the latter in planes inclined to the plane in which the main member swings on the first mentioned element, and means for independently securing each of the wing members to the first mentioned clamp element to hold the clamp closed upon the sheet of metal.

8. A clamp for pressed sheet metal shapes comprising a base, and two clamping elements the outer surface of one of which conforms to the inner surface of the desired metal sheet and the inner surface of the other of which conforms to the outer surface of the sheet, means for pivotally connecting the first mentioned element to the base to allow the former to swing on the latter in a vertical plane, the second mentioned element comprising a main member and two wing members, means for pivotally connecting the main member to the first mentioned element to allow the former to swing on the latter in a vertical plane, means for pivotally connecting the wing members to the main member to allow the former to swing on the latter in planes inclined to the plane in which the main member swings on the first mentioned element, and means for independently securing each of the members of the second mentioned clamp element to the first mentioned clamp element to hold the clamp closed upon the sheet of metal.

9. A clamp for one piece pressed sheet metal shapes comprising one element, the outer surface of which conforms to the inner surface of the desired metal sheet, and another element the inner surface of which conforms to the outer surface of the desired metal sheet, one of the elements comprising a plurality of members, means for connecting one of the members to the first mentioned element to swing vertically thereon, and means for pivotally connecting another of the members to the first mentioned member so as to allow the second member to swing in respect to the first member at an angle to the plane in which the first mentioned member swings on the first mentioned clamp element, and means for independently securing each of the members of the second-mentioned clamp element to the first clamp element to hold the clamp closed upon the sheet of metal.

10. A clamp for one piece pressed sheet metal shapes comprising one element, the outer surface of which conforms to the inner surface of the desired metal sheet, and another element, the inner surface of which conforms to the outer surface of the desired metal sheet, one of the elements comprising a plurality of members, means for pivotally supporting one of the members of the last named element for vertical swinging movement in respect to the other element, and means for pivotally connecting another of the members to the first named member so as to allow the second member to swing in respect to the first named member at an angle to the plane in which the first named member swings in respect to the first mentioned clamp element.

In testimony whereof I sign this specification in the presence of two subscribing witnesses.

NICHOLAS M. WILLET.

Witnesses:
HUGO W. KREINBRING,
EDWARD N. PAGELSEN.